United States Patent [19]
Bolt

[11] Patent Number: 5,095,375
[45] Date of Patent: Mar. 10, 1992

[54] HOLOGRAPHIC COMBINER EDGE SEAL DESIGN AND COMPOSITION

[75] Inventor: L. Gordon Bolt, Playa del Rey, Calif.

[73] Assignee: Hughes Aircraft Company, Los Angeles, Calif.

[21] Appl. No.: 677,219

[22] Filed: Mar. 29, 1991

[51] Int. Cl.$^5$ ............................................. G03H 1/02
[52] U.S. Cl. ....................... 359/1; 156/107; 430/1; 430/2
[58] Field of Search .............. 350/3.6, 3.61; 156/99, 156/107; 264/1.3; 430/1, 2

[56] References Cited

U.S. PATENT DOCUMENTS

| | | | |
|---|---|---|---|
| 4,329,409 | 5/1982 | Wreede et al. | 350/3.6 |
| 4,330,604 | 5/1982 | Wreede et al. | 350/3.6 |
| 4,789,211 | 12/1988 | Wreede | 350/3.61 |
| 4,853,306 | 8/1989 | Wreede et al. | 430/1 |
| 4,908,285 | 3/1990 | Kushibiki et al. | 430/1 |

Primary Examiner—Bruce Y. Arnold
Assistant Examiner—Martin Lerner
Attorney, Agent, or Firm—Leonard A. Alkov; Wanda K. Denson-Low

[57] ABSTRACT

The present invention comprises hologram combiners that incorporate one of several compositions of material to seal their perimeters and prevent the hologram from being attacked by water. The design of the combiner edge seals are fabricated using a perimeter edge buildup technique. The invention is implemented by the use of a band of polymer film, or a metal film such as aluminum foil, for example, that is adhered to the edge of periphery of the combiner. Adhesion is achieved by the use of a adhesive material that has been filled with a water absorbing material comprising molecular sieves such as crystalline aluminosilicate, zeolites, or calcium oxide. Calculations and accelerated static testing have indicated that the present invention provides for a hologram combiner that meets the most stringent environmental requirements, and is suitable for substantially all applications in which it may be employed.

17 Claims, 1 Drawing Sheet

HOLOGRAPHIC COMBINER EDGE SEAL DESIGN AND COMPOSITION

BACKGROUND

The present invention relates generally to holographic combiners, and more particularly, to holographic combiner edge sealing methods and materials.

Head up display combiners are an important product for use in aircraft flight applications. Military programs require flight ready combiners, and as such they must meet stringent design requirements. Without edge sealing, combiners of the type currently produced will not meet qualification test requirements relating to water absorbancy. Various methods have been demonstrated in the art to achieve water absorbancy protection for holograms, but these have been shown to provide insufficient protection. Such methods include coating the combiners with a parylene thin film coating, or coating the perimeter of combiners with unimproved thermoset adhesives.

Accordingly, it is an objective of the present invention to provide for hologram combiners and edge sealing methods therefor that achieve acceptable water protection for the holograms contained therein.

SUMMARY OF THE INVENTION

In order to achieve the above objective, the present invention comprises hologram combiners that incorporate one of several compositions of material to seal their perimeters from attack by water. The design of the combiner edge seals are fabricated using a perimeter edge buildup method as opposed to a conventional hologram recess technique, wherein the hologram is recessed from the edge of the hologram.

The present invention employs a technique for sealing the hologram combiner from atmospheric water, typically found in high relative humidity conditions. The combiner includes a plurality of glass substrates between which a hologram is disposed. The invention is implemented by the use of a band of water resistant film comprising a polymer material such as Aclar film, or a metal foil material such as aluminum foil, for example, that is adhered to the edge or periphery of the combiner and that encapsulates the hologram. Adhesion is achieved by the use of a thermoset epoxy adhesive, for example, that has been filled with a water absorbing material such as a molecular sieve material, or calcium oxide, for example.

The present invention also provides for a producible method for protecting holograms of the type used in head-up displays from attack by water, for use in combiner applications that survive conditions required by avionic hardware, including temperature shock, vibration, and birdstrike requirements, while demonstrating compatibility with ergonomic requirements.

Calculations and accelerated static testing have indicated that designs not using the edge buildup techniques of the present invention, such as recessing the edge of the hologram inward from the combiner edge, are not likely to meet normal longevity requirements. Accordingly, the present invention provides for a hologram combiner using edge buildup methods that meets the most stringent environmental requirements, and is suitable for substantially all applications in which it may be employed.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
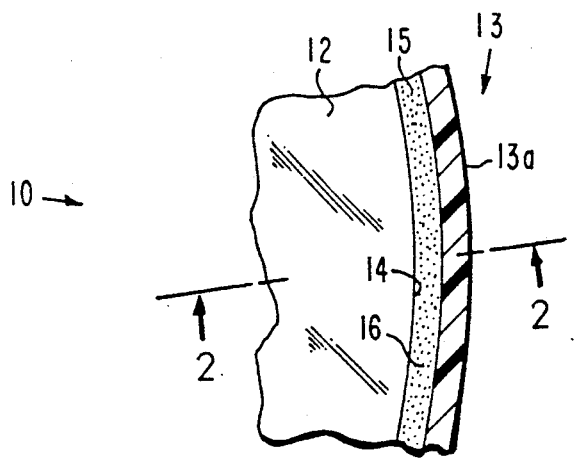
FIGS. 1 and 2 illustrate partial top and cross sectional views of a first hologram combiner constructed using the edge buildup method and materials of the present invention.
Figure 2:
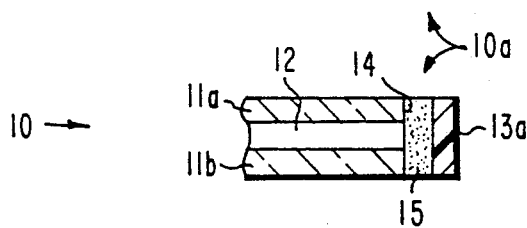

Referring to the drawings, FIGS. 1 and 2 illustrate partial top and cross sectional views of holographic combiner 10, and more specifically a first hologram combiner 10a containing a water sensitive hologram 12, constructed using the edge buildup method and materials of the present invention. The first hologram combiner 10a comprises two glass substrates 11a, 11b, between which is disposed the water sensitive hologram 12. The present invention employs a technique for sealing the first hologram combiner 10a and in particular the water sensitive hologram 12 from attack by water. The invention is implemented by the use of a band of water resistant film or barrier 13 comprising a polymer material 13a such as Aclar film, for example, that is adhered to the edge 14 or periphery 14 of the combiner 10a. The water resistant film 13 employed in the combiner 10a of the present invention comprises a low moisture vapor transmission rate film. Adhesion is achieved by the use of a thermoset epoxy adhesive 15 that has been filled with a water absorbing material 16 (shown as stippling in the drawing) such as a molecular sieve such as crystalline aluminosilicate, zeolites such as Union Carbide type 4A, or calcium oxide, for example.

The water resistant film 13, and specifically the Aclar film preferably used in the above-described edge seal method, is conventionally used in a variety of nonholographic applications due to its low moisture vapor transmission rate. Epoxy adhesives are also widely utilized in aerospace for their toughness, longevity, and chemical resistance. Molecular sieves are widely used throughout industry for their water absorption properties. However, the present invention combines the features of these materials to provide a hologram combiner having improved resistance to water.

Figure 3:
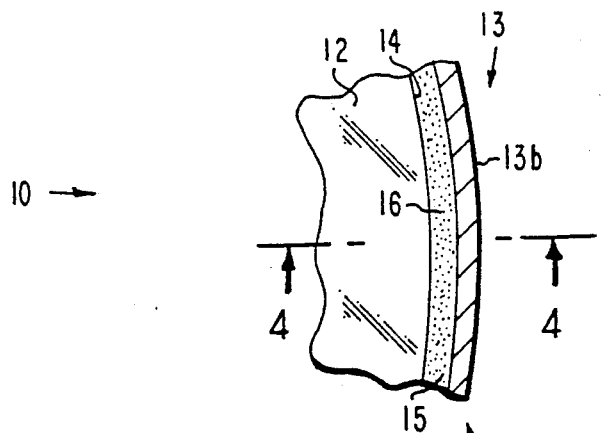
FIGS. 3 and 4 illustrate partial top and cross sectional views of a second hologram combiner constructed using the edge buildup method and materials of the present invention.
Figure 4:
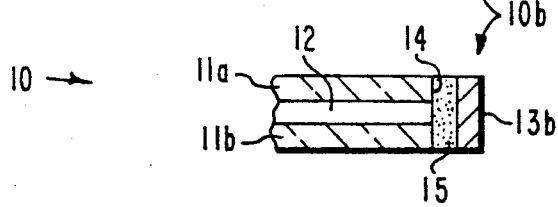

Referring to FIGS. 3 and 4, they illustrate partial top and cross sectional views of a second hologram combiner 10b, substantially described as above, but wherein a metal foil material 13b, such as aluminum foil, is employed as the edge sealing material 13. The balance of the materials employed in the second combiner 10b are the same as those in the first combiner 10a.

For the purposes of comparison, two methods may be used to reduce the amount of atmospheric water that a water sensitive hologram absorbs. These methods are (1) edge recess, and (2) edge buildup. Table 1 shows the attributes and disadvantages of the two methods, with the edge buildup method illustrating one method in accordance with the principles of the present invention.

TABLE 1

| | Method: | |
|---|---|---|
| | Edge buildup | Edge recess |
| Process Sequence: | 1. Fabricate combiner 10<br>2. Mask combiner 10<br>3. Etch/clean water resistant material 13<br>4. Laminate material 14<br>5. Trim material 13<br>6. Strip mask | 1. Fabricate combiner<br>2. Mask hologram<br>3. Etch hologram<br>4. Strip mask |
| Optical: | No field of view degradation | Field of view reduced due to hologram loss at edge |
| Performance: | 0.8 mm edge buildup provides for about 7 times the water absorbancy as the edge recess method | 0.8 mm edge recess provides for about 14% of the water absorbancy as the edge buildup method |

An experiment that was performed that demonstrates the holographic effects of water transmission through epoxy edge seal media used in the present invention, as a function of Aclar film 13a (a low moisture vapor transmission rate film), both with and without water absorbing material 16 comprising the molecular sieve material 16. The holograms 12 were dried at 1 torr vacuum for approximately 70 hours at 60 degrees Centigrade. Molecular sieves were dried at 100° C. and 1 torr vacuum for a minimum of 24 hours. These results are tabulated in Table 2. The bond line thickness of the epoxy adhesive 15 for all samples was 0.025 inches, or 0.625 mm. The humidity environment used in the tests was temperature constant in the interest of establishing a common yardstick for the longevity requirements during developmental testing. A hologram wavelength shift of more than 3 nanometers constitutes hologram failure for combiner applications.

TABLE 2

| Adhesive filled with molecular sieves? | Aclar overlay? | Hours at 65° C./100% RH before wavelength shift of 3 nm. |
|---|---|---|
| no | no | 10+/−7 |
| no | yes | 30+/−5 |
| yes | yes | 190+/−20 |

From the above results, an edge recess configuration containing no molecular sieves, and with no impermeable barrier, such as Aclar film 13a around the perimeter of the combiner 10a, would quickly fail the combiner longevity requirements. This is the most likely configuration for the edge recess method, since the translucence of the filled adhesive within the field of view would be objectionable, and since the use of a peripheral band of Aclar film 13a would implicitly mean that the edge seal configuration actually includes edge buildup features. The prototype tests using molecular sieve material 16 that fills the epoxy adhesive 15, and Aclar film 13a, demonstrate compliance with the required longevity tests, in that there was no wavelength shift from hologram combiners 10 having their edges sealed in accordance with the principles of the present invention.

Figure 5:
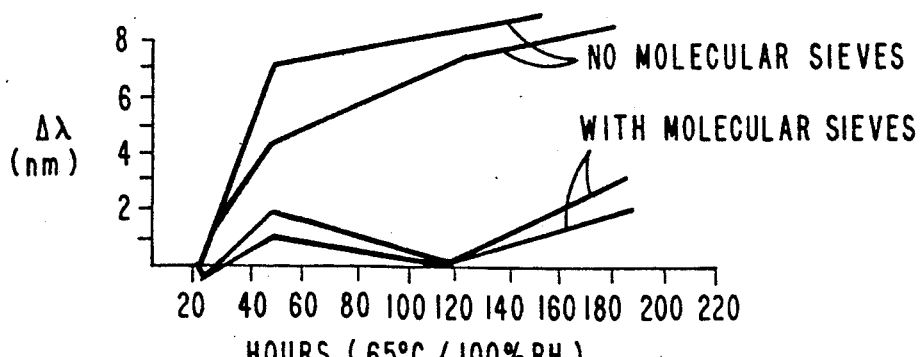
FIG. 5 shows a graph of hologram wavelength as a function of hours at temperature and humidity illustrating the performance of the hologram combiner of the present invention.

The performance of Aclar/epoxy construction in a planar configuration of the hologram combiner 10a are shown with reference to FIG. 5. A graphic depiction of wavelength shift versus conditioning time at 65° C. and 100% relative humidity is depicted in the graph in FIG. 5.

Some applications require the edge appearance of the combiner 10 to be as close as possible to that of ground glass, from both the inside and outside view. For this reason, non-opaque polymer material 13 such as Aclar film 13a are employed. Other related transparent films are generally applicable, such as Teflon film or Saran film, but Aclar film 13a is much preferred because of its very low moisture vapor transmission rate, which is approximately 10% of that of the other films. In addition, Aclar film 13a that has been treated by means of a corona discharge is preferred as the polymer material 13 due to its greater bond strength to epoxy adhesives, such as the adhesive 15.

Other applications require an edge seal appearance that is black and opaque as viewed from the inside of the combiner 10. For these applications, the foil material 13b is adhered to the edge 14 of the combiner 10 with a carbon black filled adhesive to produce a black apperance from the inside of the combiner 10. Foil materials 13b such as aluminum are suitable and have been reduced to practice because they are readily formable. Furthermore, the combiners 10 may use stainless steel foil materials in view of their greater strength.

Epoxy adhesives, however, are generally preferred because they are readily available, have a wide and continuous range of formulations and properties, have a low moisture vapor transmission rate that is about 10% of that of urethanes (the closest relative thermoset group with wide formulation latitude), provide excellent adhesion to a wide variety of materials, have excellent longevity (resistance to dry heat and humidity), and have outstanding chemical resistance.

With Aclar film 13a, epoxy adhesives 15 with an amino hardener are utilized to provide good adhesion. Epoxy adhesives 15 are available in clear formulations for translucent applications (the adhesive becomes translucent when filled with molecular sieve materials), or in black formulations for opaque edge seal applications. Eccobond brand adhesive, distributed by Emerson and Cummings is preferred with the mix ratio: a side: type 45 clear with 1 part by weight; b side: type 15 clear or black with 1.5 parts by weight. Molecular sieve materials are added on the basis of +10 parts per hundred of the premixed epoxy. Other epoxies, such as 3M 2216 are also suitable, in particular for use in opaque/metal band applications. It is apparent that molecular sieve materials are required for suitable longevity. Other materials, such as calcium oxide, are also suitable for use as a material for use in filling the adhesive 15.

The glass transition temperature of the adhesive 15 is an important property for avionic applications due to temperature shock requirements. It has been shown that Eccobond adhesive with a mix ratio of 1/1.5, and 3M brand 2216 adhesive with a mix ratio of 1/1, pass the thermal shock tests in prototype combiner configurations (circular formats with a 12 inch diameter) with an excursion rate of 1° C. per second over a range of −35° C. to +49° C., and excursion rates of 0.1° C. per minute over a range of −65° C. to +95° C. It is not expected that adhesives with glass transition temperatures ($T_g$) substantially above 30° C. will pass this test; the $T_g$ of Eccobond is 0±5° C. and 3M 2216 is 20±5° C.

The adhesion of epoxy adhesives to aluminum and glass is enhanced by the use of primers, such as silane functional coupling agents. Types of primers found to be suitable are those such as Dow Chemical Z-6020 which is amino functional. Others, such as epoxy functional Z-6040 are preferred due to their better hydrolytic stability.

Thus there has been described new and improved holographic combiners, that include water resistant holographic combiner edge sealing methods and materials. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A hologram-combiner comprising:
   a plurality of substrates, each having two surfaces and an edge;
   a hologram disposed between adjacent surfaces of the substrates and having an edge coextensive with the edges of the substrates;
   a adhesive disposed on the edge of the hologram having a molecular sieve material disposed therein; and
   a low moisture vapor transmission rate film adhered to the edges of the hologram and substrates by means of the adhesive.

2. The hologram combiner of claim 1 wherein the adhesive comprises a thermoset adhesive.

3. The hologram combiner of claim 2 wherein the thermoset adhesive has been filled with a water absorbing material.

4. The hologram combiner of claim 3 wherein the water absorbing material comprises calcium oxide.

5. The hologram combiner of claim 1 wherein the molecular sieve material comprises crystalline aluminosilicate.

6. The hologram combiner of claim 1 wherein the molecular sieve material comprises a zeolite material.

7. The hologram combiner of claim 1 wherein the film comprises an Aclar film.

8. The hologram combiner of claim 7 wherein the Aclar film has been corona discharge treated to provide for greater bond strength to the epoxy adhesives.

9. The hologram combiner of claim 1 wherein the film comprises an aluminum foil.

10. A method of making a water resistant hologram combiner that comprises the steps of:
    providing a plurality of substrates, each having two surfaces and an edge;
    disposing a hologram between adjacent surfaces of the substrates such that its edge is coextensive with the edges of the substrates;
    disposing a adhesive on the edge of the hologram that has a molecular sieve material disposed therein;
    adhering a low moisture vapor transmission rate film to the coextensive edges of the hologram and substrates by means of the adhesive.

11. The method of claim 10 wherein the step of adhering a low moisture vapor transmission rate film to the hologram comprises the step of adhering an Aclar film to the hologram.

12. The method of claim 11 wherein the Aclar film has been treated by corona discharge to provide for greater bond strength to the adhesive.

13. The method of claim 10 wherein the step of adhering a low moisture vapor transmission rate film to the hologram comprises the step of adhering a metal foil to the coextensive edges of the hologram and substrate.

14. The method of claim 10 wherein the adhesive is filled with a water absorbing material.

15. The method of claim 14 wherein the molecular sieve material comprises crystalline aluminosilicate.

16. The method of claim 14 wherein the molecular sieve material comprises zeolite material.

17. The method of claim 14 wherein the water absorbing material comprises calcium oxide.

* * * * *